(12) United States Patent
Gill et al.

(10) Patent No.: US 6,539,131 B1
(45) Date of Patent: Mar. 25, 2003

(54) OPTICAL MSK MODULATOR

(75) Inventors: Douglas M. Gill, Hoboken, NJ (US); Xing Wei, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 3 days.

(21) Appl. No.: 09/933,644

(22) Filed: Aug. 21, 2001

(51) Int. Cl.⁷ .............................................. G02F 1/295
(52) U.S. Cl. ................................ 385/3; 385/4; 359/183; 359/158; 359/138
(58) Field of Search ........................ 385/3, 4, 45, 1.2, 385/39, 40, 24; 359/183, 188, 158, 138

(56) References Cited

U.S. PATENT DOCUMENTS 5,892,858 A * 4/1999 Vaziri et al. ................... 385/2
6,002,816 A * 12/1999 Penninckx et al. ............ 385/3

* cited by examiner

*Primary Examiner*—Robert H. Kim
*Assistant Examiner*—Richard Kim
(74) *Attorney, Agent, or Firm*—Peter V. D. Wilde (57) ABSTRACT

The specification describes an optical modulator implemented with an MSK format. The modulator creates two separate pulse streams (one pulse stream comprising the odd bits and the other comprising the even bits of the data stream) using a 1-by-2 pulse generator. The modulator then uses electrooptic phase modulators to encode the odd and even numbered bits separately, and a 50/50 coupler to remix them.

19 Claims, 4 Drawing Sheets

OPTICAL MSK MODULATOR

FIELD OF THE INVENTION

This invention relates to optical modulators and, more particularly, optical modulators using minimum-shift keying (MSK).

BACKGROUND OF THE INVENTION

Minimum-shift keying (MSK) is a well-known modulation format in radio and microwave communications. See M. L. Doelz and E. T. Heald, Minimum-shift data communication system, U.S. Pat. No. 2,977,417, Mar. 28, 1961. It is also called fast frequency shift keying (Fast FSK). See R. deBuda, IEEE Trans. Commun. COM-20, p. 429 (1972). Here by MSK we refer to all continuous phase frequency shift keying (CPFSK) modulation schemes with a modulation index h=0.5. See J. B. Anderson, T. Aulin, and C.-E. Sundberg, Digital Phase Modulation (Plenum Press, New York,1986); C.-E. Sundberg, IEEE Communications Magazine, Vol. 24, p.25 (1986).

Compared with amplitude modulation, MSK in fiber optic based communications systems has a narrower power spectrum and suffers less nonlinear degradation by keeping the amplitude envelope constant. In spite of its many advantages, MSK has never been used in any commercial optical fiber communication systems mainly due to the difficulties in manufacturing reliable optical MSK transmitters and receivers. Today in optical fiber communications, the transmitted data is encoded in the intensity of the lightwave (known as on-off keying or OOK) instead of the phase.

STATEMENT OF THE INVENTION

We have implemented external electro-optical modulation in an MSK format for the first time. The MSK modulator of the invention employs a CLOCK section and a DATA section. In the CLOCK section, the input cw light source is carved into two clock pulse streams. One way to achieve this is to use a pair of phase modulators and a coupler to carve the input laser source into two clock pulse streams. The DATA section then uses another pair of phase modulators to appropriately modulate the phase of each clock pulse. Finally, a second coupler is used to add up the two streams in a desired manner, thus implementing the MSK transmission mode.

DETAILED DESCRIPTION OF THE INVENTION

Figure 1:
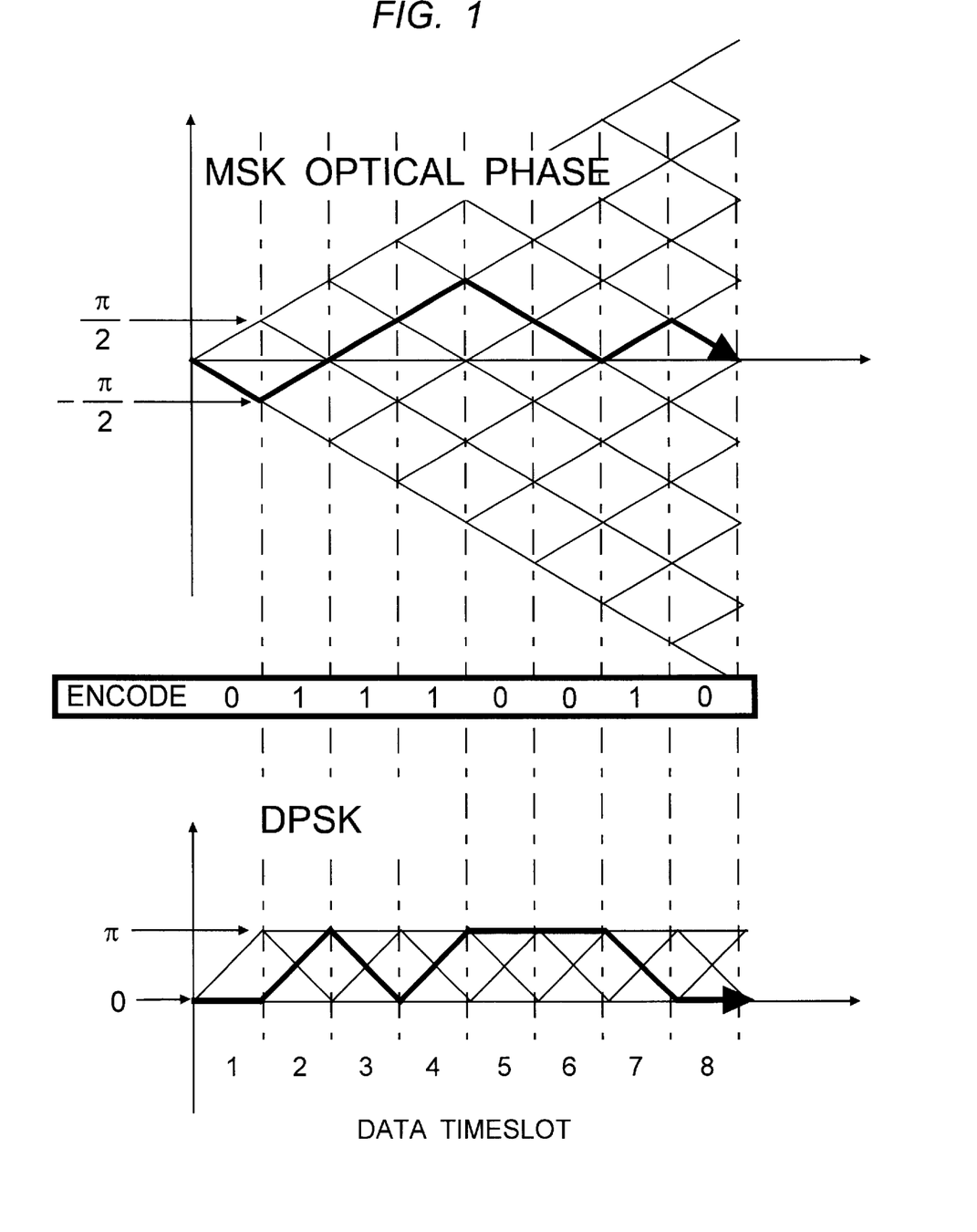
FIG. 1 shows a diagram of an example "phase tree" for both the minimum-shift keying (MSK) and differential phase shift keying (DPSK) modulation schemes.

Modulation of the phase of a coherent lightwave can be used for data communication. With reference to FIG. 1, a "phase tree" of MSK is shown, as well as that of a similar but slightly different phase modulation scheme known as differential phase shift keying (DPSK). Both use a differential coding scheme to represent data. In MSK, a digital 1 and a digital 0 are represented by an upward (+) and a downward (−) phase shift of π/2 radians (or 90°), respectively. In DPSK, a digital 1 is represented by a phase shift (either up or down) of π radians (or 180°) and a digital 0 is represented by no change in phase. FIG. 1 shows an example of an 8 bit data stream 01110010. It is noted that in a real MSK or DPSK system, the phase trace can be a smooth curve, as would be produced by a modulator with finite bandwidth, and does not necessarily follow the straight segments of the schematic representation as shown in FIG. 1. Both MSK and DPSK provide advantages over the traditional OOK modulation format for optical fiber transmission. One such advantage is the suppression of cross phase modulation, which is currently the dominating impairment in dense wavelength division multiplexed (DWDM) systems, due to Kerr nonlinearity of the optical fiber. From a practical point of view, DPSK is easier to implement than MSK. This is because in DPSK the phase variation is constrained between 0 and π and can be achieved with a commercially available phase modulator, for example, a LiNbO3 phase modulator. Both experiments and simulations of high speed optical DPSK data transmission (typically 10 Gb/s) have been reported. See M. Rohde, et al., Electronics Letters, Vol. 36, p.1483 (2000); J.-K. Rhee, et al., IEEE Photonics Technology Letters, Vol. 12, p. 1627 (2000).

However, a typical LiNbO3 phase modulator is not effective for MSK, because in MSK the phase variation occurs in a way that can be described as a random walk that has no limit. In an extreme case, if the data stream contains a 11111111 bit sequence, the phase would keep increasing and reach a total relative phase shift of 4π as a result of this bit sequence. It is currently difficult with known circuitry to provide enough driver voltage to achieve such a phase shift using existing phase modulators. For this reason optical MSK has rarely been studied, although there were attempts at using direct (internal) phase modulation of semiconductor lasers at lower speed. See M. Shirasaki, et al., Electronics Letters, Vol.24, p.486 (1988).

MSK has important advantages over DPSK. For example, MSK has a narrower power spectrum than DPSK. In addition, MSK signals can be converted effectively to a non-return-to-zero (NRZ) OOK format at the receiver by using a 1-bit delay line interferometer (to be described in more detail below). By comparison DPSK signal that is converted to an OOK format at the receiver suffers an approximate 1 dB eye-closure penalty. Although optical MSK is more difficult to implement than DPSK, it is now made possible with this invention.

Figure 2:
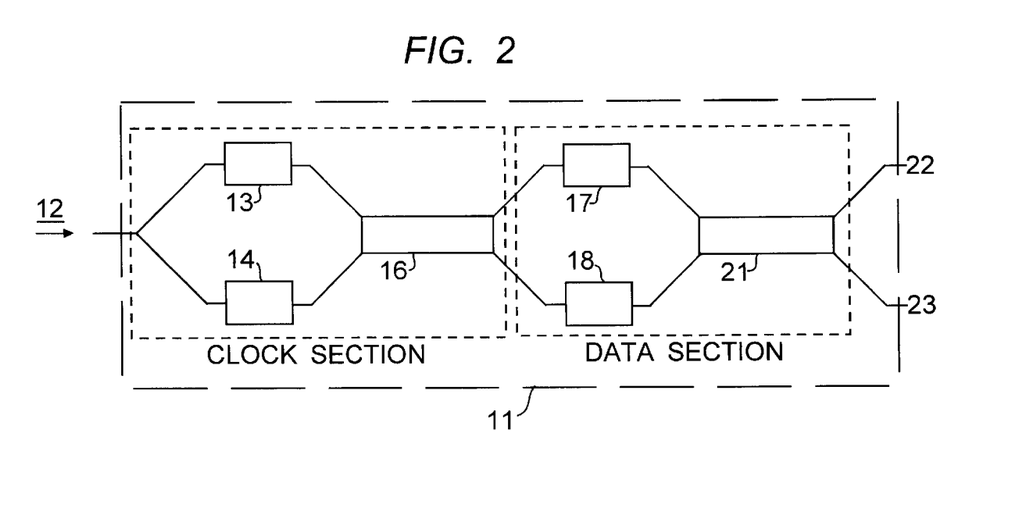
FIG. 2 shows an example of an optical circuit diagram that can be used to implement an integrated MSK optical modulator according to the invention.

An optical modulator based on the MSK format is shown in FIG. 2. This figure is a photonic circuit diagram which may be implemented in an optical integrated circuit (OIC) represented by dashed box 11. The laser input to the OIC is shown at 12. Typical DWDM systems operate in the C-band, or the C-band+L-band, which correspond generally to wavelengths of 1530–1610 nm. Extended L-band systems may operate to 1620 nm. Lasers for these systems are well known.

The integrated circuit (IC) implementation suggested by box 11 in FIG. 2 is representative of a variety of approaches for the manufacture of the assembly shown in the figure. These include using board mounted IC subassemblies and/or discrete components, interconnections using planar waveguides or fibers, optical bench technology using a rigid glass or semiconductor platform, etc.

In the device of FIG. 2 the input laser beam is processed in the CLOCK section by using a 1-by-2 pulse carver to create two pulse streams from the input cw light. One way to achieve this is by splitting the input cw light, as shown in the diagram, and guiding the two resulting channels into phase shift devices 13, 14 (phase shift devices 13, 14, 17 and 18 will here after be referred to as phase shifters). The CLOCK section modulates the laser input with a clock signal running at a frequency that is half the nominal data rate. The two outputs of the phase shifters 13 and 14 are then combined in a 50—50 coupler 16. The structure and operation of optical couplers will be described in more detail below. The outputs of the two channels from coupler 16 are 50% duty cycle pulse streams, with a repetition rate equal to the above mentioned clock rate. The two pulse streams are guided into a second pair of phase shifters 17, 18 of the DATA section as shown. Phase shifters 17 and 18 are then used to encode data onto the two pulse streams by appropriately modulating, using one device or the other, the phase of every pulse. Therefore, the data is encoded in the electronic control voltages of the phase shifters 17 and 18. This is an important feature of the device and distinguishes it from similar arrangements that have been proposed for frequency shifting devices. (See "An Electro-Optical Frequency Shifter, http://www.nasatech.com/Briefs/Sept00/NP020531.html)

The outputs of the phase shifters 17 and 18 are guided through coupler 21. The output of coupler 21 is shown at 22, 23.

Figure 3:
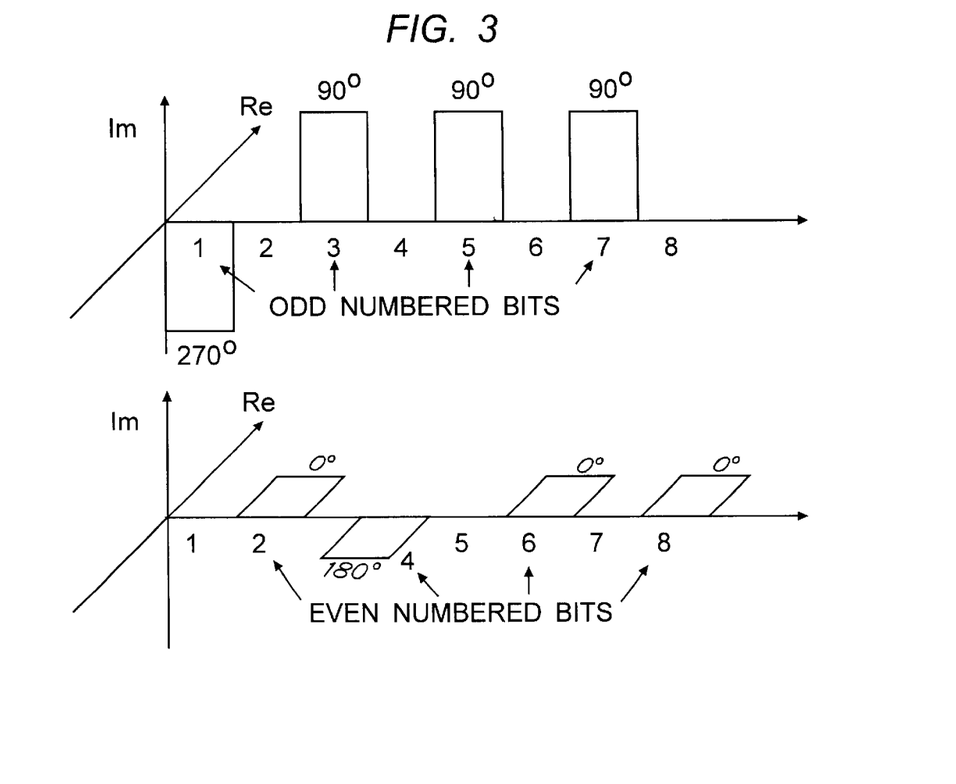
FIG. 3 shows a schematic diagram of the time dependent phasor representation for the phase and amplitude of the two optical pulse streams created by the CLOCK section and phase modulated by the DATA section of the MSK modulator (shown in FIG. 2). These bit streams are subsequently combined to form the final output from the MSK modulator.

A typical data stream 01110010 as shown in FIG. 1 is now used to explain the operation of the MSK modulator. The concept of separating odd and even numbered timeslots is illustrated in FIG. 3. Note that in practice the waveforms will contain finite bandwidth and will not have abrupt edges as shown in FIG. 3. The use of finite bandwidth in this device does not significantly degrade performance. The representation presented in FIG. 3 is schematic and is only intended for instructional purposes. Additional details are shown in Table 1.

TABLE 1

| n | 0 | 1 | 2 | 3 | 4 | 5 | 6 | 7 | 8 |
|---|---|---|---|---|---|---|---|---|---|
| B |  | 0 | 1 | 1 | 1 | 0 | 0 | 1 | 0 |
| φ | 0 | $-\frac{\pi}{2}$ | 0 | $\frac{\pi}{2}$ | $\pi$ | $\frac{\pi}{2}$ | 0 | $\frac{\pi}{2}$ | 0 |
| C | 1 | $-i$ | 1 | $i$ | $-1$ | $i$ | 1 | $i$ | 1 |
| V(13) | 0 | $\frac{V_\pi}{2}$ | 0 | $\frac{V_\pi}{2}$ | 0 | $\frac{V_\pi}{2}$ | 0 | $\frac{V_\pi}{2}$ | 0 |
| V(14) | 0 | $-\frac{V_\pi}{2}$ | 0 | $-\frac{V_\pi}{2}$ | 0 | $-\frac{V_\pi}{2}$ | 0 | $-\frac{V_\pi}{2}$ | 0 |
| A(17) | 0 | $i$ | 0 | $i$ | 0 | $i$ | 0 | $i$ | 0 |
| A(18) | $i$ | 0 | $i$ | 0 | $i$ | 0 | $i$ | 0 | $i$ |
| V(17) |  | $V_\pi$ |  | 0 |  | 0 |  | 0 |  |
| V(18) | $V_\pi$ |  | $V_\pi$ |  | 0 |  | $V_\pi$ |  | $V_\pi$ |
| A(22) | $\frac{1}{\sqrt{2}}$ | $\frac{-i}{\sqrt{2}}$ | $\frac{1}{\sqrt{2}}$ | $\frac{i}{\sqrt{2}}$ | $\frac{-1}{\sqrt{2}}$ | $\frac{i}{\sqrt{2}}$ | $\frac{1}{\sqrt{2}}$ | $\frac{i}{\sqrt{2}}$ | $\frac{1}{\sqrt{2}}$ |
| A(23) | $\frac{-i}{\sqrt{2}}$ | $\frac{1}{\sqrt{2}}$ | $\frac{-i}{\sqrt{2}}$ | $\frac{-1}{\sqrt{2}}$ | $\frac{i}{\sqrt{2}}$ | $\frac{-1}{\sqrt{2}}$ | $\frac{-i}{\sqrt{2}}$ | $\frac{-1}{\sqrt{2}}$ | $\frac{-i}{\sqrt{2}}$ |

Table 1 shows the bit number (n), the content of the example binary data stream (B), the relative optical phase (Φ), the complex representation of the phase angle at the output of the device (C), the required voltages at each phase modulator (V(13), V(14), V(17), V(18)), and the complex amplitudes for the optical pulses at various locations within the device (A(17), A(18), A(22), A(23)) for each bit. Note that all the even numbered C's are real (±1, which represents a relative phase shift of 0 or 180 degrees) while all the odd numbered C's are imaginary (±i, which represent a relative phase shift of 90 or 270 degrees). V(13) and V(14) are the control voltages of phase shifters 13 and 14 in the CLOCK section, which are simply 50% duty cycle clock signals running at half of the nominal data rate:

$$V_n(13) = [1 + (-1)^{n+1}]V_\pi/4$$

$$V_n(14) = -[1 + (-1)^{n+1}]V_\pi/4$$

The meaning of $V_\pi$ will be explained below. A(17) and A(18) are the complex amplitudes of the clock pulse signals right before they enter phase shifters 17 and 18 in the DATA section (referenced to the laser source at the input 12). Note that these clock pulses arrive at shifter 17 for the odd numbered timeslots and arrive at shifter 18 for the even numbered timeslots. The phase shifters 17 and 18 are then used to control the phase of the odd and even numbered pulses separately (imparting either no phase shift or an additional π phase shift). V(17) and V(18) are the control voltages of phase shifters 17 and 18, and can be derived from the original data B with an electronic logic circuit. This will be discussed in more detail below. A(22) and A(23) are the complex amplitudes of the two outputs 22 and 23. Note that A(22) is the desired output (same as C except for an unimportant constant), while A(23) is the complex conjugate of A(22) with an unimportant phase factor. The output 22 will be used for data transmission, and the output 23 can be reserved for other purposes, for example, transmitter monitoring.

The mathematical models of the basic components in the device, as well as how these components are coordinated to perform the function of an MSK transmitter, are presented for completeness. A primary component of the device is the phase shifter (13,14,17,18) which shifts the phase of the input by $\pi V/V_\pi$ radians. In other words, the output is equal to the input multiplied by $\exp(i\pi V/V_\pi)$. Here $V_\pi$ is the voltage corresponding to a phase shift of $\pi$ radians. The second major component of the device is a 50—50 coupler (16 and 21 as shown in FIG. 2). For purposes of the discussion below, the output of phase shifter 13 is designated signal "X" and the output of phase shifter 14 is designated signal "Y".

The two signals X and Y are guided into 50—50 coupler 16 in which, by well known traveling wave principles, the lightwave signals in the two channels interfere. With proper choice of the length of the coupler, also following well known coupler design, the output signals in the two output channels (referred to here for convenience as "top" branch and "bottom" branch) from the 50—50 coupler are represented by:

$$\text{top branch: } (X+iY)/\sqrt{2}$$
$$\text{bottom branch: } (Y+iX)/\sqrt{2}$$

The splitter at the input 12 can also be modeled as a 50—50 coupler with only the top input branch (the other input branch not being used). Using the laser source at input 12 as the reference (zero phase), X and Y are expressed as:

$$X = \exp[i\pi V(13)/V_\pi]/\sqrt{2}$$
$$Y = i\exp[i\pi V(14)/V_\pi]/\sqrt{2}$$

Consider now the odd numbered bits (n=1,3,5,7), for which $$V(13) = V_\pi/2$$
$$V(14) = V_\pi/2$$

and therefore the outputs of coupler 16 are:

$$A(17) = \{\exp(i\pi/2)/\sqrt{2}+i[i\exp(-i\pi/2)/\sqrt{2}]\}/\sqrt{2} = i$$
$$A(18) = \{i\exp(-i\pi/2)/\sqrt{2}+i[\exp(i\pi/2)/\sqrt{2}]\}/\sqrt{2} = 0$$

for the top and bottom branches, respectively. Similarly, for all the even numbered bits (n=2,4,6,8) A(17)=0 and A(18)=i. These two sets of clock signals are then guided through a second pair of phase shifters 17 and 18, experiencing a phase change of $\pi V(17)/V_\pi$ radians and $\pi V(18)/V_\pi$ radians, respectively. As mentioned earlier, phase shifters 17 and 18 perform phase modulation for the odd and even numbered bits, respectively. The phase-modulated pulses from 17 and 18 are then mixed through coupler 21. The output, 22, 23, from coupler 21 thus contains both odd and even bits.

Taking the first bit as an example, the control voltage V(17)=$V_\pi$, therefore the output of phase shifter 17 is:

$$A(17)\times\exp[i\pi V(17)/V_\pi]=i\times\exp(i\pi)=-i$$

This signal then splits through coupler 21, resulting in two outputs:

$$\text{top branch: } A(22)=(-i+0)/\sqrt{2}=-i/\sqrt{2}$$
$$\text{bottom branch: } A(23)=[0+i(-i)]/\sqrt{2}=1/\sqrt{2}$$

The output A(22) and A(23) for the rest of the data can be worked out in a similar way.

Figure 4:
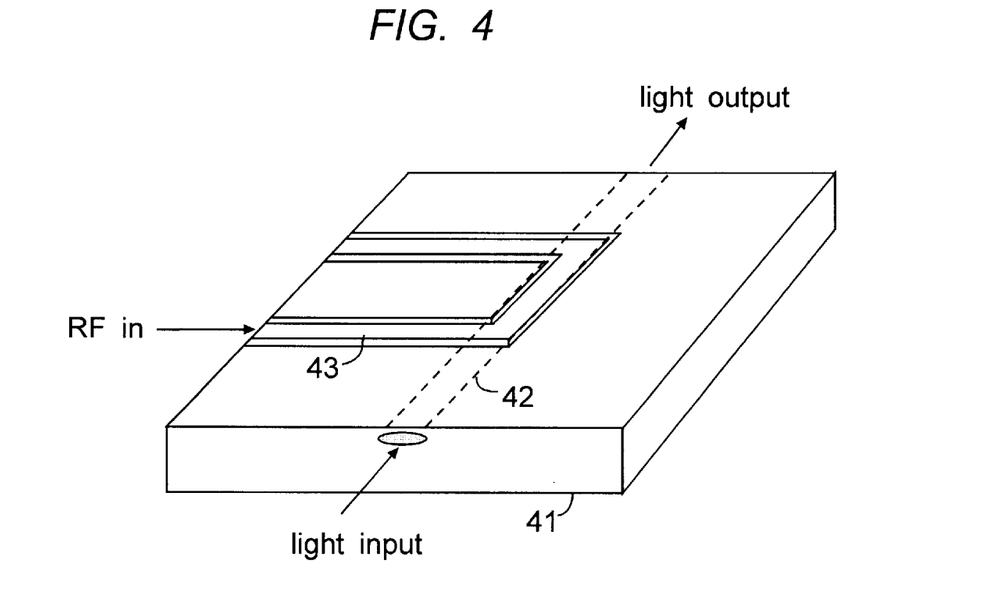
FIG. 4 is a schematic view of a phase shift device for providing the phase shift required in the MSK modulator of the invention.

The phase shifters 13, 14 and 17, 18 are shown in FIG. 4 where electro-optic substrate 41 is shown with a diffused waveguide 42 formed in the substrate. The electro-optic substrate is preferably lithium niobate due to the highly developed technology existing for this material. However, other electro-optic materials can be substituted. The waveguide 42 may be formed by titanium diffusion. The details of the formation of the waveguide are omitted here for simplicity. Techniques for forming suitable waveguides in lithium niobate and other electrooptic materials are well known in the art. The strip electrode 43 overlies the active electro-optic region. By impressing a suitable voltage on the stripline as schematically represented by the RF input in FIG. 4, the phase of the light traveling through the waveguide is shifted. The degree of shift is controlled in a known manner by adjusting the properties, mainly the optical path length, of the active region of the device.

While a conventional electrooptic phase shifter is given here by way of example, other phase shifting devices, for example, phase shifters implemented in semiconductors, typically III–V semiconductors, using photonic interactions may also be used. It will be evident to those skilled in the art that when a semiconductor phase shifter is used it would be convenient to integrate the phase shifter with waveguides formed in the semiconductor substrate.

Figure 5:
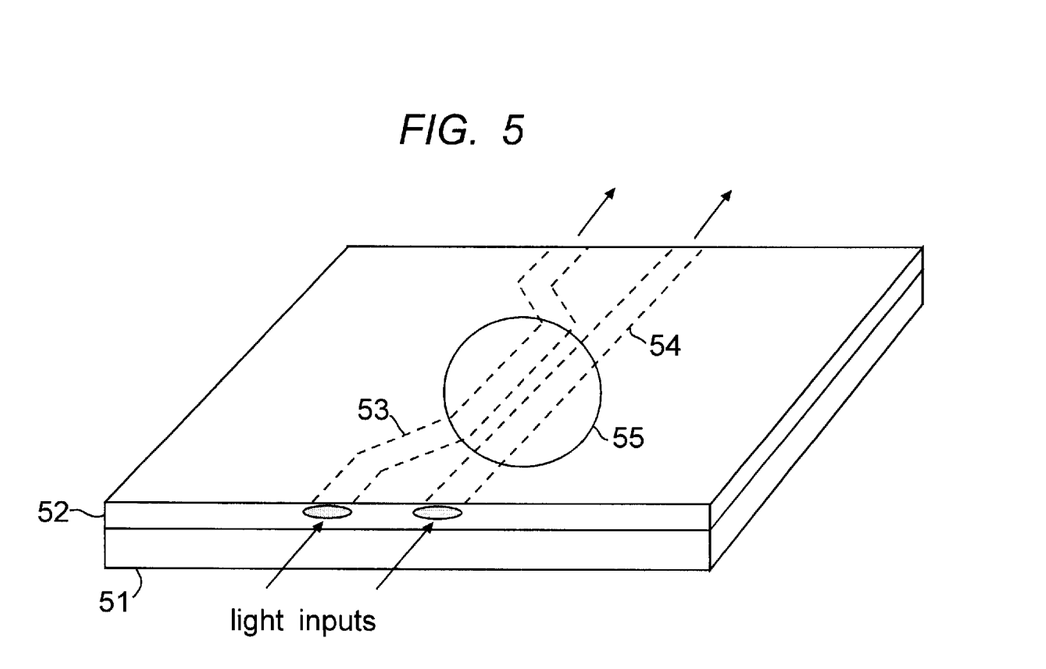
FIG. 5 is a schematic diagram of an optical coupler suitable for use in the MSK modulator of the invention.

The 50/50 optical couplers 16 and 21 are shown in FIG. 5. The design and operation of 50/50 optical couplers are well known. These are key elements in many planar lightguide OICs. For example, 50/50 couplers with coupling ratios which vary from zero to one are used in Fourier filters and ring filters. Couplers having a 50% power splitting ratio, as used in this invention, are also used in Mach-Zehnder Interferometers (MZI), and are widely used in optical transmission systems. These devices are often implemented in silica based planar lightguide circuits (PLCs).

With reference to FIG. 5, the substrate for the coupler is shown at 51. The substrate may be glass, LiNbO$_3$, or other suitable rigid support. For high quality optical integrated circuits, a suitable substrate material is silicon. This is known as silicon optical bench (SOB) technology, in which the processing of state of the art PLCs follows, in some respects, silicon IC wafer fabrication. The waveguide layer in this technology is SiO$_2$ which is represented by layer 52 in the figure. This layer is typically undoped silica, grown by steam oxidation or deposited by low pressure chemical vapor deposition (LPCVD). Other techniques for making thick SiO$_2$ layers, such as flame hydrolysis (FHD or VAD), also can be used. Two waveguides are shown in layer 52, at 53 and 54, with a coupling section 55 where the waveguides run parallel and closely spaced to one another.

The basic operation of a directional coupler is well known. It splits lightwaves coherently. The input lightwave to waveguide 53 is P$_i$ and the output lightwave from waveguide 54 is $P_o$ When the waveguides are closely spaced, as in FIG. 5, the evanescent tail of the lightwave in waveguide 53 extends into waveguide 54 and induces an electric polarization. The polarization generates a lightwave in waveguide 54, which couples back to waveguide 53.

In the device shown, the two waveguides are single mode and are parallel in the coupling region. Waveguide 53 bends away from waveguide 52 at the end of the active region, and gradually decouples. The input lightwave $P_i$ and the output lightwave $P_o$ are related by:

$$P_i = k\, P_o$$

where k is the coupling ratio. The coupling ratio is strongly affected by the coupling region, and in particular by the core-to-cladding refractive index difference. The index difference can be adjusted, typically by heating, to adjust the coupling ratio after the fabrication of the waveguides has been completed.

Silicon and $LiNbO_3$ have been mentioned above as the substrate material but other materials can be used, based on materials such as InP, GaAs, fused silica, et al., even polymer materials.

The logic used to convert the original data to the control voltages V(17) and V(18) is described in Table 2.

TABLE 2

| n | 0 | 1 | 2 | 3 | 4 | 5 | 6 | 7 | 8 |
|---|---|---|---|---|---|---|---|---|---|
| B |   | 0 | 1 | 1 | 1 | 0 | 0 | 1 | 0 |
| D | 0 | 0 | 1 | 0 | 1 | 1 | 1 | 0 | 0 |
| m | 0 | 0 | 1 | 1 | 2 | 2 | 3 | 3 | 4 |
| E | 1 | 1 | 0 | 0 | 1 | 1 | 0 | 0 | 1 |
| F | 1 | 1 | 1 | 0 | 0 | 0 | 1 | 0 | 1 |
| V(17) |   | $V_\pi$ |   | 0 |   | 0 |   | 0 |   |
| V(18) | $V_\pi$ |   | $V_\pi$ |   | 0 |   | $V_\pi$ |   | $V_\pi$ |

In the first step, the original binary data stream $B_n$ is converted to a differentially encoded data stream $D_n$ such that a change ($D_n$=NOT $D_{n-1}$) corresponds to $B_n$=1 and no change ($D_n$=$D_{n-1}$) corresponds to $B_n$=0. In the second step, the data timeslots are grouped in pairs and labeled by an integer m (m=0,1,2,3 . . . ). The timeslot numbers can be represented as n=2m+1 for odd numbers n=2m for even numbers In the third step, another clock signal $E_n$ is generated, running at a quarter of the bit rate:

$$E_n = [1 + (-1)^m]/2$$

In the fourth step, another data stream $F_n$ is calculated by combining $D_n$ and $E_n$ with an XOR (exclusive OR) operation:

$$F_n = D_n \text{ XOR } E_n$$

And in the last step, $F_n$ determines the control voltage:

$$V_{2m+1}(17) = F_{2m+1} \times V_\pi$$
$$V_{2m}(18) = F_{2m} \times V_\pi$$

All these steps can be performed with standard digital data processing techniques. The mathematical proof of the validity of the above approach is straightforward and will be omitted here. It is worth mentioning that V(17) should be maintained as flat (constant) as possible during an odd numbered timeslot and its transitions should only occur in even numbered timeslots. For V(18), it is just the opposite. This will guarantee that a transition of the control voltage does not take place when light is present in the phase shifters 17 and 18.

Figure 6:
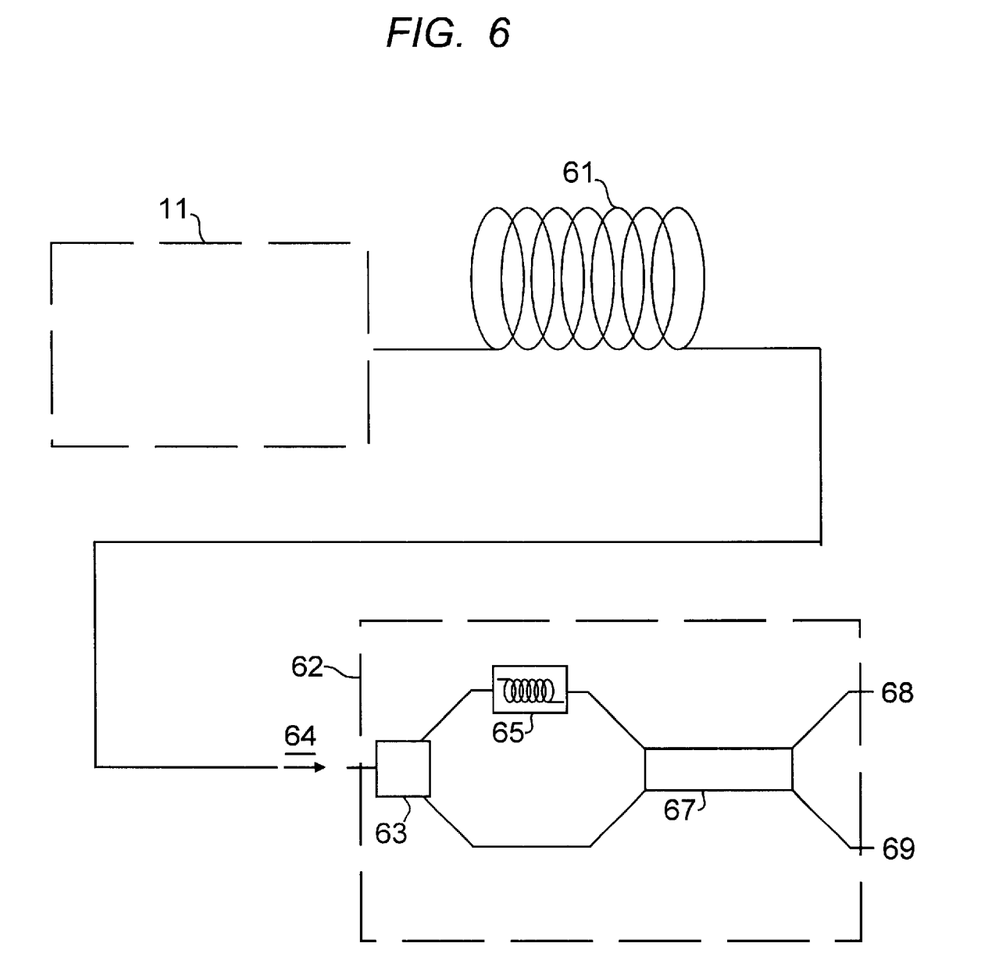
FIG. 6 is a schematic diagram showing a communication system including a receiver useful for implementing the invention.

With reference to FIG. 6, the encoded MSK signal from the output of modulator 11 is transmitted through an optical fiber transmission line 61 to a remote receiver station where the MSK signal is decoded in decoder section 62. It should be understood that decoding the MSK signal may be accomplished by a variety of techniques and means and the following is given by way of example. FIG. 6 shows a 50—50 splitter 63, equally splitting the input signal 64 into two branches, an upper branch and a lower branch, as shown. The signal in the upper branch is guided through delay means 65, which delays that signal by one bit period (one timeslot). Known optical delay means can be used, for example, the configuration can be realized in any appropriate OIC substrate such as those used in silicon optical bench technology. The figure represents the delay means as a suitable length of optical fiber, which could also be used. The two branches, one (either one) delayed by one bit period, are combined coherently with 50—50 coupler 67. A suitable coupler is described above. The coupler produces the interference product of two adjacent bits in the MSK signal. At one output of the 50—50 coupler, a constructive or destructive interference occurs depending on whether the phase shift of the current bit is $+\pi/2$ or $-\pi/2$ with respect to the previous bit. The output occurs at 68, 69, and is effectively the MSK signal converted to OOK format.

The CLOCK section in the foregoing description performs both the function of converting the cw (continuous wave) input at 12 to a pulse stream, then creating odd and even bits from the pulse stream. Those skilled in the art will recognize that the input to the modulator may also be a light signal that is already a pulse stream so the CLOCK section directs the odd numbered pulses and even numbered pulses to two separate optical paths.

The description above also assigns phase changes of plus or minus $\pi/2$ (in the CLOCK section) or plus $\pi$ (in the DATA section). Other phase relationships may be found that give similar or equivalent results.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical modulator comprising:
   a. a light signal input,
   b. a clock section for dividing the light signal input into a first optical pulse stream occupying even time slots and a second optical pulse stream occupying odd time slots, c. a first waveguide section for guiding the first optical pulse stream,
d. a second waveguide section for guiding the second optical pulse stream,
e. an encoding signal,
f. a first phase shifter in the first waveguide section for creating a phase shift of 0 or $\pi$ in the first light signal in response to the encoding signal,
g. a second phase shifter in the second waveguide section for creating a phase shift of 0 or $\pi$ in the second light signal in response to the encoding signal, and
h. a 50/50 coupler for mixing the first and second light signals.

2. The optical modulator of claim 1 wherein the phase shifters and waveguides comprise lithium niobate.

3. The optical modulator of claim 1 wherein the phase shifters and waveguides comprise a III–V semiconductor.

4. The modulator of claim 1 wherein the input signal is an optical pulse stream.

5. The modulator of claim 1 wherein the input signal is a continuous wave source.

6. An optical modulator comprising:
a. a light signal input,
b. means for splitting the light signal input into a first light signal and a second light signal,
c. a first waveguide section for guiding the first light signal,
d. a second waveguide section for guiding the second light signal,
e. a first phase shifter in the first waveguide section,
f. a second phase shifter in the second waveguide section,
g. a first voltage source in the first phase shifter for creating a phase shift of 0 or $\pi/2$ in the first light signal,
h. a second voltage source in the second phase shifter for creating a negative phase shift of 0 or $-\pi/2$ in the second light signal,
i. a first 50/50 coupler for converting the first and second light signals to third and fourth light signals,
j. a third waveguide section for guiding the third light signal,
k. a fourth waveguide section for guiding the fourth light signal,
l. a third phase shifter in the third waveguide section,
m. a fourth phase shifter in the fourth waveguide section,
n. an encoding signal,
o. a third voltage source in the third phase shifter for creating a phase shift of 0 or $\pi$ in the third light signal in response to the encoding signal,
p. a fourth voltage source in the fourth phase shifter for creating a phase shift of 0 or $\pi$ in the fourth light signal in response to the encoding signal,
q. a second 50/50 coupler for mixing the third and fourth light signals.

7. The optical modulator of claim 6 wherein the phase shifters and waveguides comprise lithium niobate.

8. The optical modulator of claim 6 wherein the waveguides comprise doped $SiO_2$.

9. The optical modulator of claim 6 wherein the phase shifters and waveguides comprise a III–V semiconductor.

10. The optical modulator of claim 6 wherein the first voltage source and second voltage source operate in response to a clock.

11. The optical modulator of claim 10 wherein the clock signal has a duty cycle of 50%, and a frequency of $\pi/2$, where R is the nominal bit rate.

12. An optical transmission system comprising:
a. a first light signal input A,
b. a clock section for dividing the first light signal input into a first optical pulse stream occupying even time slots and a second optical pulse stream occupying odd time slots,
c. a first waveguide section for guiding the first optical pulse stream,
d. a second waveguide section for guiding the second optical pulse stream,
e. an encoding signal,
f. a first phase shifter in the first waveguide section for creating a phase shift of 0 or $\pi$ in the first light signal in response to the encoding signal,
g. a second phase shifter in the second waveguide section for creating a phase shift of 0 or $\pi$ in the second light signal in response to the encoding signal,
h. a 50/50 coupler for mixing the first and second light signals,
j. an optical fiber transmission line for transmitting the output signal to a receiver, the signal designated input signal B,
k. means for splitting the light signal input B into a fifth light signal and a sixth light signal,
l. a fifth waveguide section for guiding the fifth light signal,
m. a sixth waveguide section for guiding the sixth light signal,
n. an optical delay line in the fifth waveguide section,
o. a third 50/50 coupler for converting the fifth and sixth light signals to seventh and eighth light signals thereby producing an output signal in OOK format.

13. The transmission system of claim 12 wherein the clock signal has a duty cycle of 50%, and a frequency of $\pi/2$, where R is the nominal bit rate.

14. An optical transmission system comprising:
a. a first light signal input A,
b. means for splitting the light signal input A into a first light signal and a second light signal,
c. a first waveguide section for guiding the first light signal,
d. a second waveguide section for guiding the second light signal,
e. a first phase shifter in the first waveguide section,
f. a second phase shifter in the second waveguide section,
g. a first voltage source in the first phase shifter for creating a phase shift of 0 or $\pi/2$ in the first light signal,
h. a second voltage source in the second phase shifter for creating a negative phase shift of 0 or $-\pi/2$ in the second light signal,
i. a first 50/50 coupler for converting the first and second light signals to third and fourth light signals,
j. a third waveguide section for guiding the third light signal,
k. a fourth waveguide section for guiding the fourth light signal, l. a third phase shifter in the third waveguide section,
m. a fourth phase shifter in the fourth waveguide section,
n. a third voltage source in the third phase shifter for creating a phase shift of 0 or $\pi$ in the third light signal,
o. a fourth voltage source in the fourth phase shifter for creating a phase shift of 0 or $\pi$ in the fourth light signal,
p. a second 50/50 coupler for mixing the third and fourth light signals, thereby producing an output signal in MSK format,
q. an optical fiber transmission line for transmitting the output signal to a receiver, the signal designated input signal B,
r. means for splitting the light signal input B into a fifth light signal and a sixth light signal,
s. a fifth waveguide section for guiding the fifth light signal,
t. a sixth waveguide section for guiding the sixth light signal,
u. an optical delay line in the fifth waveguide section,
v. a 50/50 coupler for converting the fifth and sixth light signals to seventh and eighth light signals thereby producing an output signal in OOK format.

15. The transmission system of claim 14 further including a clock, and the first voltage source and second voltage source operate in response to the clock.

16. The transmission system of claim 15 further including means for providing an encoded data signal and the third voltage source and the fourth voltage source operate in response to the encoded data signal.

17. The transmission system of claim 16 wherein the clock signal has a duty cycle of 50%, and a frequency of R/2, where R is the nominal bit rate.

18. The transmission system of claim 16 wherein the input signal is an optical pulse stream.

19. The transmission system of claim 16 wherein the input signal is a continuous wave source.

* * * * *